United States Patent
Smaus et al.

(10) Patent No.: US 7,555,633 B1
(45) Date of Patent: Jun. 30, 2009

(54) INSTRUCTION CACHE PREFETCH BASED ON TRACE CACHE EVICTION

(75) Inventors: Gregory William Smaus, Austin, TX (US); Mitchell Alsup, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 815 days.

(21) Appl. No.: 10/700,033

(22) Filed: Nov. 3, 2003

(51) Int. Cl.
- G06F 15/00 (2006.01)
- G06F 9/30 (2006.01)
- G06F 9/40 (2006.01)

(52) U.S. Cl. .................................................. 712/207
(58) Field of Classification Search ................. 712/207
See application file for complete search history.

(56) References Cited

U.S. PATENT DOCUMENTS

| | | | |
|---|---|---|---|
| 3,896,419 | A | 7/1975 | Lange et al. |
| 5,210,843 | A | 5/1993 | Ayers |
| 5,381,533 | A | 1/1995 | Peleg |
| 5,881,261 | A | 3/1999 | Favor et al. |
| 5,896,528 | A | 4/1999 | Katsuno et al. |
| 5,930,497 | A | 7/1999 | Cherian et al. |
| 6,014,742 | A | 1/2000 | Krick et al. |
| 6,145,055 | A * | 11/2000 | Fujimoto ............. 711/128 |
| 6,167,536 | A | 12/2000 | Moann |
| 6,185,675 | B1 | 2/2001 | Kranich et al. |
| 6,195,744 | B1 | 2/2001 | Favor et al. |
| 6,216,206 | B1 * | 4/2001 | Peled et al. ............. 711/133 |
| 6,233,678 | B1 | 5/2001 | Bala |
| 6,247,121 | B1 | 6/2001 | Akkary et al. |
| 6,256,727 | B1 | 7/2001 | McDonald |
| 6,256,728 | B1 | 7/2001 | Witt et al. |
| 6,339,822 | B1 | 1/2002 | Miller |
| 6,345,295 | B1 | 2/2002 | Beardsley et al. |
| 6,357,016 | B1 | 3/2002 | Rodgers et al. |
| 6,449,714 | B1 | 9/2002 | Sinharoy |
| 6,493,821 | B1 | 12/2002 | D'Sa et al. |
| 6,578,128 | B1 | 6/2003 | Arsenault et al. |
| 6,823,428 | B2 | 11/2004 | Rodriguez et al. |

(Continued)

FOREIGN PATENT DOCUMENTS

EP    0 957 428    11/1999

(Continued)

OTHER PUBLICATIONS

Lai, et al., "Dead-Block Prediction & Dead-Block Correlating Prefetchers," 2001 IEEE, 11 pages.

(Continued)

*Primary Examiner*—Eddie P Chan
*Assistant Examiner*—Brian P Johnson
(74) *Attorney, Agent, or Firm*—Robert C. Kowert; Meyertons, Hood, Kivlin, Kowert & Goetzel, P.C.

(57) ABSTRACT

Various embodiments of methods and systems for implementing a microprocessor that fetches a group of instructions into instruction cache in response to a corresponding trace being evicted from the trace cache are disclosed. In some embodiments, a microprocessor may include an instruction cache, a trace cache, and a prefetch unit. In response to a trace being evicted from trace cache, the prefetch unit may fetch a line of instructions into instruction cache.

23 Claims, 5 Drawing Sheets

U.S. PATENT DOCUMENTS

| | | | |
|---|---|---|---|
| 6,848,031 B2 * | 1/2005 | Jourdan | 711/137 |
| 6,973,543 B1 | 12/2005 | Hughes | |
| 7,003,629 B1 | 2/2006 | Alsup | |
| 7,325,097 B1 * | 1/2008 | Darcy | 711/117 |
| 2002/0095553 A1 * | 7/2002 | Mendelson et al. | 711/118 |
| 2002/0144101 A1 | 10/2002 | Wang et al. | |
| 2003/0023835 A1 | 1/2003 | Kalafatis et al. | |
| 2004/0083352 A1 | 4/2004 | Lee | |
| 2004/0143721 A1 | 7/2004 | Pickett et al. | |
| 2004/0193857 A1 | 9/2004 | Miller et al. | |
| 2004/0216091 A1 | 10/2004 | Groeschel | |
| 2005/0125613 A1 | 6/2005 | Kim et al. | |
| 2005/0125632 A1 | 6/2005 | Alsup et al. | |

FOREIGN PATENT DOCUMENTS

| | | |
|---|---|---|
| GB | 2 281101 | 4/2003 |

OTHER PUBLICATIONS

Slechta, et al., "Dynamic Optimization of Micro-Operations," 2002 IEEE, 12 pages.

Jacobson, "High-Performance Frontends for Trace Processors," University of Wisconson-Madison, 1999, pp. 19, 20, 36, 37, 104-122.

U.S. Appl. No. 10/822,468, filed Apr. 12, 2004, Alsup, et al.

Yuan Chou, et al., "Instruction Path Coprocessors," Mar. 2000, pp. 1-24.

Friendly, et al., "Putting the Fill Unit to Work: Dynamic Organizations for Trace Cache Microprocessors," Dept. of Electrical Engineering and Computer Sciences, The Univ. of Michigan, Dec. 1998, 9 pages.

Bryan Black, et al., "Turboscalar: A High Frequency High IPC Microarchitecture," Dept. of Electrical and Computer Engineering, Carnegie Mellon Univ., Jun. 2000, pp. 1-.

Rotenberg, et al., "Trace Cache: A Low Latency Approach to High Bandwidth Instruction Fetching," Apr. 11, 1996, pp. 1-48.

Merten, et al., "An Architectural Framework for Run-Time Optimization," Jun. 2001, pp. 1-43.

Hinton, G., et al., "A 0.18-MUM CMOS IA-32 Processor with a 4-GHZ Integer Execution Unit," IEEE Journal of Solid-State Circuits, vol. 36, No. 11, Nov. 2001, pp. 1617-1627.

Sanjay J. Patel, et al., "replay: A Hardware Framework for Dynamic Optimization," IEEE, vol. 50, No. 6, Jun. 2001, pp. 590-608.

Jacobson, et al., "Instruction Pre-Processing in Trace Processors," IEEE Xplore, Jan. 1999, 6 pages.

Bryan Black, et al., "The Block-Based Trace Cache," IEEE, 1999, pp. 196-207.

Rotenberg, et al., "Trace Cache: A Low Latency Approach to High Bandwidth Instruction Fetching," IEEE, 1996, pp. 24-34.

Grant Braught, "Clas #21-Assemblers, Labels & Pseudo Instructions," Dickenson College, Fall Semester 2000, 6 pages.

Patterson, et al., "Computer Architecture A Quantitative Approach," Second Edition, Morgan Kaufmann Publishers, Inc., 1996, pp. 271-278.

Palmer, et al., "Fido: A Cache That Learns to Fetch," Proceedings of the 17$^{th}$ International Conference on Very Large Data Bases, Barcelona, Sep. 1991, pp. 255-264.

Chen et al., "Eviction Based Cache Placement for Storage Caches," USENIX 2003 Annual Technical Conference, (13 pages).

* cited by examiner

INSTRUCTION CACHE PREFETCH BASED ON TRACE CACHE EVICTION

BACKGROUND OF THE INVENTION

1. Field of the Invention

This invention is related to the field of microprocessors, and more particularly, to microprocessors having trace caches.

2. Description of the Related Art

Instructions processed in a microprocessor are encoded as a sequence of ones and zeros. For some microprocessor architectures, instructions may be encoded with a fixed length, such as a certain number of bytes. For other architectures, such as the x86 architecture, the length of instructions may vary. The x86 microprocessor architecture specifies a variable length instruction set (i.e., an instruction set in which various instructions are each specified by differing numbers of bytes). For example, the 80386 and later versions of x86 microprocessors employ between 1 and 15 bytes to specify a particular instruction. Instructions have an opcode, which may be 1-2 bytes, and additional bytes may be added to specify addressing modes, operands, and additional details regarding the instruction to be executed.

In some microprocessor architectures, each instruction may be decoded into one or more simpler operations prior to execution. Decoding an instruction may also involve accessing a register renaming map in order to determine the physical register to which each logical register in the instruction maps and/or to allocate a physical register to store the result of the instruction.

In general, the bandwidth of the instruction fetch and decode portions of a microprocessor may determine whether the execution cores are fully utilized during each execution cycle. Accordingly, it is desirable to be able to provide enough bandwidth in the instruction fetch and decode portions of the microprocessor to kept the execution core as fully supplied with work as possible.

Typically, instructions are fetched from system memory into instruction cache in contiguous blocks. The instructions included in these blocks are stored in the instruction cache in compiled order. During program execution, instructions are often executed in a different order than compiled order. For example, when a branch is taken within the code, non-sequential instructions (in compiled order) may be executed sequentially. In such cases, the instructions following the taken branch cannot generally be fetched from the instruction cache during the same cycle as the branch instruction because they are stored in non-contiguous locations. To attempt to overcome this instruction fetch bandwidth limitation, a superscalar microprocessor may incorporate a trace cache.

Trace cache differs from instruction cache in that instructions stored in trace cache are typically stored in execution order as opposed to compiled order. Storing operations in execution order allows a trace containing one or more taken branch operations to be accessed during a single cycle from trace cache, whereas accessing the same sequence from instruction cache would require several cycles.

SUMMARY

Various embodiments of methods and systems for implementing a microprocessor that fetches a group of instructions into instruction cache in response to a corresponding trace being evicted from the trace cache are disclosed. In some embodiments, a microprocessor may include an instruction cache, a trace cache, and a prefetch unit. In response to a trace being evicted from the trace cache, the prefetch unit may fetch a line of instructions into the instruction cache.

In some embodiments, the prefetch unit may fetch a plurality of lines of instructions into instruction cache in response to a trace being evicted from the trace cache. If an evicted trace includes one or more branch instructions, the prefetch unit may fetch a line including the first instruction (in program order) of the evicted trace, as well as one or more lines including the instructions following the predicted-taken branch instructions included within the trace. For example, if an evicted trace includes two predicted-taken branch instructions, the prefetch unit may respond to the eviction of the trace by fetching three lines of instructions into instruction cache. The first line fetched may include the first instruction of the evicted trace. The second line fetched may include the first instruction following the first branch instruction of the evicted trace and the third line fetched may include the first instruction following the second branch instruction of the evicted trace.

In some embodiments, the prefetch unit may check certain conditions to determine whether or not to fetch a line of instructions into instruction cache in response to the eviction of a trace from trace cache. For example, when a given trace is evicted from trace cache, statistics recording the frequency of use of the trace may be examined. If the frequency of use for the evicted trace is above a threshold value, the prefetch unit may fetch one or more lines of instructions corresponding to instruction included in the evicted trace into the instruction cache. If the frequency of use for the evicted trace is below the threshold value, the prefetch unit may inhibit the fetching of lines of instructions into instruction cache.

BRIEF DESCRIPTION OF THE DRAWINGS

A better understanding of the present invention can be obtained when the following detailed description is considered in conjunction with the following drawings, in which.

Figure 1:
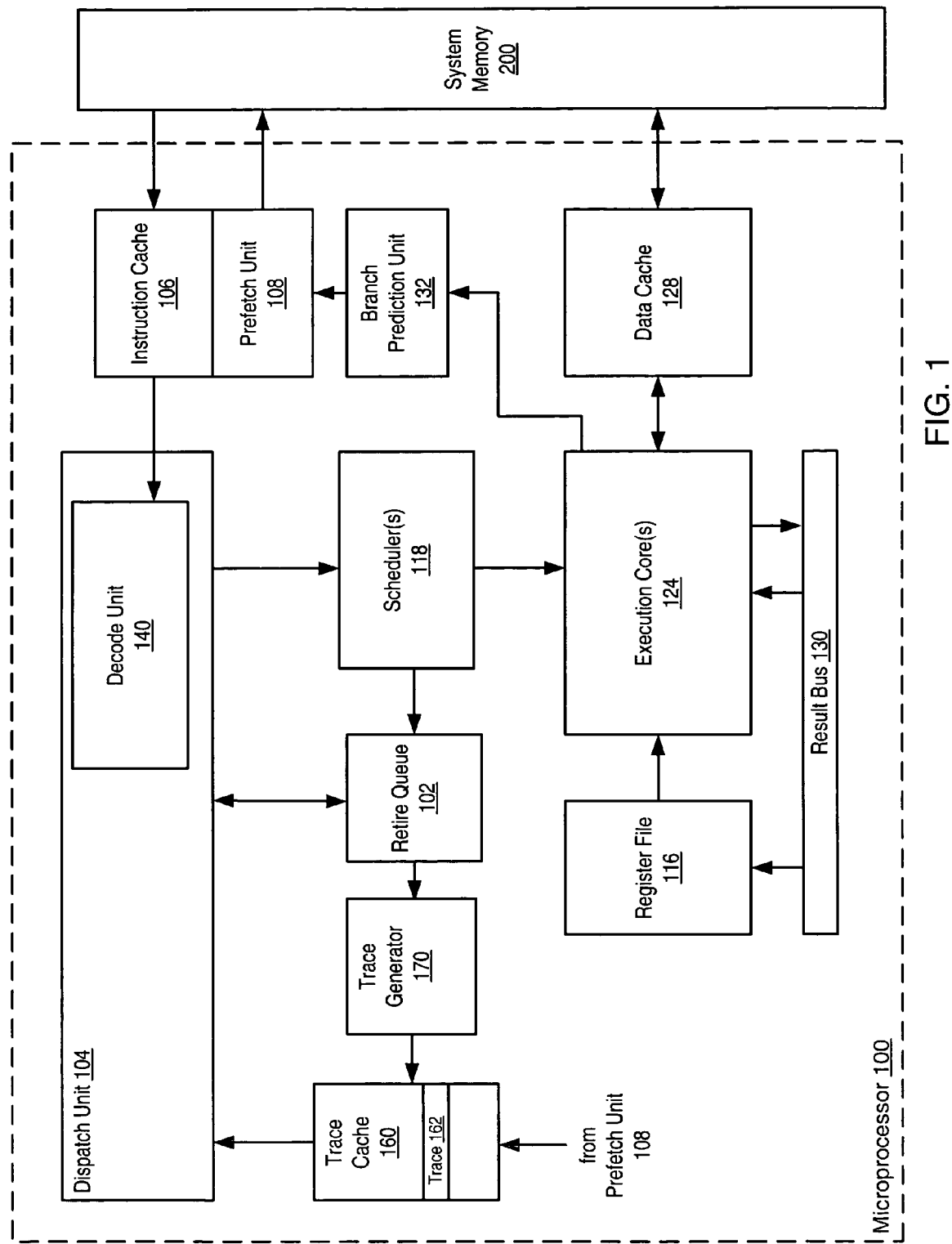
FIG. 1 shows a microprocessor incorporating a trace cache, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of logical components included in one embodiment of a microprocessor 100 that fetches a group of instructions into instruction cache 106 in response to a corresponding trace being evicted from the trace cache 160. Microprocessor 100 is configured to execute instructions stored in a system memory 200. Many of these instructions operate on data stored in system memory 200. Note that system memory 200 may be physically distributed throughout a computer system and may be accessed by one or more microprocessors 100. In some embodiments, the microprocessor 100 may be designed to be compatible with the x86 architecture. Note that microprocessor 100 may also include and/or be coupled to many other components in addition to those shown here. For example, additional levels of cache may be included (internal and/or external to microprocessor 100) between microprocessor 100 and system memory 200. Similarly, microprocessor 100 may include a memory controller configured to control system memory 200 in some embodiments. Additionally, the interconnections between logical components may vary between embodiments.

Microprocessor 100 may include an instruction cache 106 and a data cache 128. Microprocessor 100 may include a prefetch unit 108 coupled to the system memory 200. Prefetch unit 108 is a means for prefetching instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Prefetch unit 108 may also fetch instructions from instruction cache 106 and traces from trace cache 160 into dispatch unit 104. Instructions may be fetched from instruction cache 106 in response to a given instruction address missing in trace cache 160. Likewise, instructions may be fetched from system memory 200 in response to a given address missing in instruction cache 106. Prefetch unit 108 may also fetch instructions corresponding to a trace from instruction cache 106 in response to the trace being evicted from trace cache 160 as described in more detail below.

A dispatch unit 104 may be configured to receive instructions from instruction cache 106 and to receive decoded and/or partially decoded operations from trace cache 160. The dispatch unit 104 may include a decode unit 140 to decode instructions received from instruction cache 106. The dispatch unit 104 may also include a microcode unit for use when handling microcoded instructions.

The dispatch unit 104 is configured to dispatch operations to scheduler(s) 118. One or more schedulers 118 may be coupled to receive dispatched operations from dispatch unit 104 and to issue operations to one or more execution cores 124. Results generated by execution core(s) 124 may be output to a result bus 130. These results may be used as operand values for subsequently issued instructions and/or stored to register file 116. A retire queue 102 may be coupled to scheduler(s) 118 and dispatch unit 104. The retire queue may be configured to determine when each issued operation may be retired.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Dispatch unit 104 may output signals including bit-encoded operations executable by the execution core(s) 124 as well as operand address information, immediate data and/or displacement data. Decode unit 140 may be used to decode certain instructions into one or more operations executable within execution core(s) 124. Simple instructions may correspond to a single operation. More complex instructions may correspond to multiple operations. Upon receiving an operation that involves the update of a register, the dispatch unit 104 may reserve a register location within register file 116 to store speculative register states (in an alternative embodiment, a reorder buffer may be used to store one or more speculative register states for each register). A register map may translate logical register names of source and destination operands to physical register names in order to facilitate register renaming. Such a register map may track which registers within register file 116 are currently allocated and unallocated.

When operations are handled by dispatch unit 104, if a required operand is a register location, register address information may be routed to a register map or a reorder buffer. For example, in the x86 architecture, there are eight 32-bit logical registers (e.g., EAX, EBX, ECX, EDX, EBP, ESI, EDI and ESP). Physical register file 116 (or a reorder buffer) includes storage for results that change the contents of these logical registers, allowing out of order execution. A physical register in register file 116 may be allocated to store the result of each operation that modifies the contents of one of the logical registers. Therefore, at various points during execution of a particular program, register file 116 (or, in alternative embodiments, a reorder buffer) may have one or more registers that contain the speculatively executed contents of a given logical register.

A register map may assign a physical register to a particular logical register specified as a destination operand for an operation. Register file 116 may have one or more previously allocated physical registers assigned to a logical register specified as a source operand in a given operation. The register map may provide a tag for the physical register most recently assigned to that logical register. This tag may be used to access the operand's data value in the register file 116 or to receive the data value via result forwarding on the result bus 130. If the operand corresponds to a memory location, the operand value may be provided on the result bus for result forwarding and/or storage in register file 116. Operand data values may be provided to execution core(s) 124 when the operation is issued by one of the scheduler(s) 118. Note that in alternative embodiments, operand values may be provided to a corresponding scheduler 118 when an operation is dispatched (instead of being provided to a corresponding execution core 124 when the operation is issued).

The microprocessor 100 of FIG. 1 supports out of order execution. A retire queue 102 (or, alternatively, a reorder buffer) may keep track of the original program sequence for register read and write operations, allow for speculative instruction execution and branch misprediction recovery, and facilitate precise exceptions. In many embodiments, retire queue 102 may function similarly to a reorder buffer. However, unlike a typical reorder buffer, retire queue 102 may not provide any data value storage. In alternative embodiments, retire queue 102 may function more like a reorder buffer and also support register renaming by providing data value storage for speculative register states. In some embodiments, retire queue 102 may be implemented in a first-in-first-out configuration in which operations move to the "bottom" of the buffer as they are validated, thus making room for new entries at the "top" of the queue. As operations are retired, retire queue 102 may deallocate registers in register file 116 that are no longer needed to store speculative register states and provide signals to a register map indicating which registers are currently free. By maintaining speculative register states within register file 116 (or, in alternative embodiments, within a reorder buffer) until the operations that generated those states are validated, the results of speculatively-executed operations along a mispredicted path may be invalidated in the register file 116 if a branch prediction is incorrect.

Retire queue 102 may also provide signals identifying program traces to trace generator 170. Trace generator 170 may also be described as a fill unit. Trace generator 170 may store traces identified by retire queue 102 into trace cache 160. Each trace may include instructions included in several different basic blocks. A basic block may be a set of instructions that are all executed as a unit. For example, a group of instructions that begins just after a branch instruction and ends with another branch instruction may comprise a basic block. If the first instruction of the basic block is executed, then all instructions included in the basic block may be executed, otherwise none of the instructions within the basic block may be executed. The traces stored into trace cache 160 may include several decoded or partially decoded instructions. As used herein, a "trace" is a group of instructions that are stored within a single trace cache entry in the trace cache 160. Trace generator 170 is a means for generating traces.

Prefetch unit 108 may fetch instructions from trace cache 160 into dispatch unit 104. In some embodiments in which instructions in trace cache are at least partially decoded, when operations are fetched from the trace cache (as opposed to when instructions are loaded from instruction cache 106), the decode unit 140 may be at least partially bypassed, resulting in a decreased number of dispatch cycles for the cached operations. Accordingly, the trace cache 160 may allow the dispatch unit 104 to amortize the time taken to partially (or fully) decode the cached operations in decode unit 140 over several execution iterations if traces are executed more than once.

The bit-encoded operations and immediate data provided at the outputs of dispatch unit 104 may be routed to one or more schedulers 118. Note that as used herein, a scheduler is a device that detects when operations are ready for execution and issues ready operations to one or more execution units. For example, a reservation station is a scheduler. Each scheduler 118 may be capable of holding operation information (e.g., bit encoded execution bits as well as operand values, operand tags, and/or immediate data) for several pending operations awaiting issue to an execution core 124. In some embodiments, each scheduler 118 may not provide operand value storage. Instead, each scheduler may monitor issued operations and results available in register file 116 in order to determine when operand values will be available to be read by execution core(s) 124 (from register file 116 or result bus 130). In some embodiments, each scheduler 118 may be associated with a dedicated execution core 124. In other embodiments, a single scheduler 118 may issue operations to more than one of the execution core(s) 124.

Schedulers 118 may be provided to temporarily store operation information to be executed by the execution core(s) 124. As stated previously, each scheduler 118 may store operation information for pending operations. Additionally, each scheduler may store operation information for operations that have already been executed but may still reissue. Operations are issued to execution core(s) 124 for execution in response to the values of any required operand(s) being made available in time for execution. Accordingly, the order in which operations are executed may not be the same as the order of the original program instruction sequence.

In one embodiment, each of the execution core(s) 124 may include components configured to perform integer arithmetic operations of addition and subtraction, as well as shifts, rotates, logical operations, and branch operations. A floating point unit may also be included to accommodate floating point operations. One or more of the execution core(s) 124 may be configured to perform address generation for load and store memory operations.

The execution core(s) 124 may also provide information regarding the execution of conditional branch instructions to branch prediction unit 132. If information from the execution core 124 indicates that a branch prediction is incorrect, the branch prediction unit 132 may flush instructions subsequent to the mispredicted branch that have entered the instruction processing pipeline and redirect prefetch unit 108. The redirected prefetch unit 108 may then begin fetching the correct set of instructions from instruction cache 106, trace cache 160, and/or system memory 200. In such situations, the results of instructions in the original program sequence that occurred after the mispredicted branch instruction may be discarded.

Results produced by components within execution core(s) 124 may be output on the result bus 130 to the register file 116 if a register value is being updated. If the contents of a memory location are being changed, the results produced within execution core(s) 124 may be provided to data cache unit 128.

Trace Cache

Trace generator 170 may be configured to receive retired instructions from retire queue 102 and to store those retired operations within traces in trace cache 160. As mentioned above, instructions may be stored into traces within the trace cache 160 in execution order as opposed to program order. Note that in alternative embodiments, trace generator 170 may be coupled to the front-end of the microprocessor (e.g., before or after the dispatch unit) and configured to generate traces from instructions detected within the pipeline at that point within the microprocessor.

Under certain conditions, as described in greater detail below, the trace cache generator may evict traces from trace cache 160. When a trace is evicted from the trace cache 160, there may be a fairly high probability that the instructions included in the evicted trace will be re-executed in the near term. In anticipation of these instructions being needed again, upon evicting a trace, the trace generator 170 may cause prefetch unit 108 to fetch instructions corresponding to the evicted trace into instruction cache 106.

Figure 2:
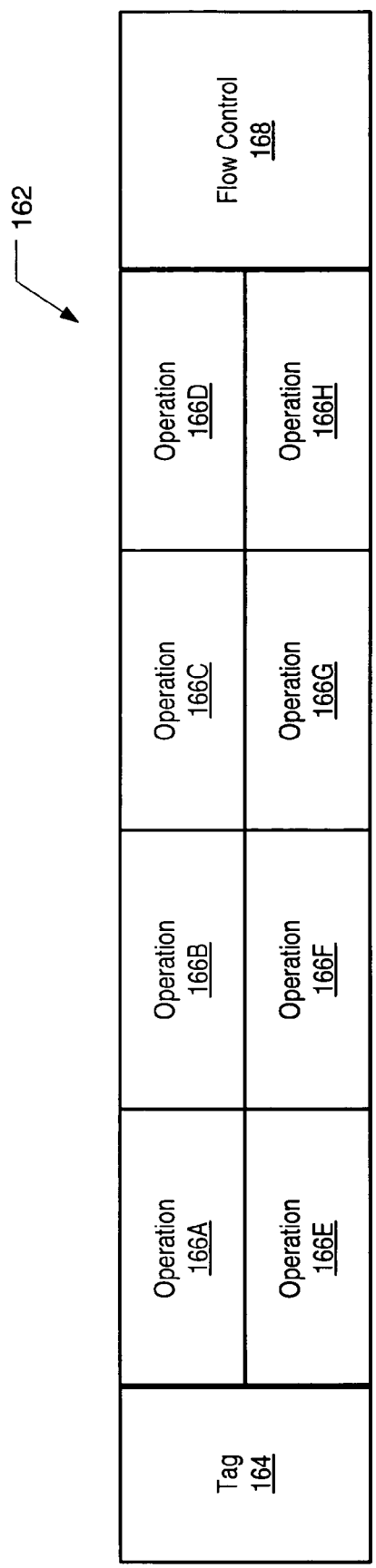
FIG. 2 illustrates an exemplary trace cache entry, according to one embodiment.

Trace cache 160 may include several trace cache entries. Each trace cache entry may store a group of instructions referred to as a trace. FIG. 2 illustrates one embodiment of a trace cache entry 162. In the embodiment of FIG. 2, a trace cache entry 162 may store up to eight decoded and/or partially decoded instructions in operation storage units 166A-166H. Throughout this disclosure, drawing elements identified by the same reference numeral and a unique alphabetic identifier (e.g., operation storage units 166A-166H) may be collectively referred to by that reference numeral alone (e.g., operation storage units 166). Note that other embodiments may include fewer or additional operation storage units 166, allowing storage of different numbers of operations within each trace cache entry 162.

Certain operation storage units 166 within a trace cache entry 162 may be reserved for certain types of operations. For example, in one embodiment, operation storage units 166A-166D may be used to store memory operations. Similarly, operation storage units 166E-166H may be used to store data operations. Note that other embodiments may associate certain types of operations with certain operation storage units differently (or not at all).

In addition to including several operation storage units 166, each trace cache entry 162 also includes an identifying tag 164 and flow control information 168. Tag 164 may be similar to a tag in instruction cache 106, allowing prefetch unit 108 to determine whether a given operation hits or misses in trace cache 160. For example, tag 164 may include all or some of the address bits identifying an operation within the trace cache entry (e.g., the tag may include the address of the earliest operation, in program order, stored within that trace). In some embodiments, the tag may include enough information that operations may be independently addressable within a trace. In other embodiments, only the first operation within a trace may be addressable.

In the illustrated embodiment, each trace may include up to two branch operations. Other embodiments may include fewer or additional branch operations within each trace. Flow control information 168 may include a label for each branch operation included within the trace. The label may be an indication identifying the address to which control should branch depending on the resolution (taken, not taken) of a respective branch. Thus, each item of flow control information 168 may be associated with a particular branch operation. For example, in one embodiment, one flow control information storage location within a trace may be associated with the first branch operation in the trace and the other flow control information storage location may be associated with the second branch in the trace. Alternatively, the flow control information may include tags or other information identifying the branch operation with which that flow control information is associated. In yet other embodiments, a branch prediction and/or information identifying which flow control information corresponds to a branch operation may be stored with that branch operation within operation storage 166.

After trace generator 170 has been in operation for some time, many entries in trace cache 160 may contain valid traces. When trace generator 170 produces the next trace, there may not be an available trace cache entry in which the trace may be stored. Therefore, the trace generator may evict one of the entries in trace cache 160 to make room for the new trace. Trace generator 170 is an example of a means for identifying traces to be evicted from trace cache 160 and evicting the identified traces.

Each time a trace is evicted from the trace cache 160, the prefetch unit 108 may fetch corresponding instructions into the instruction cache 106. Thus, if the instructions included in the evicted trace are again executed, those instructions may be re-fetched from the instruction cache (as opposed to having to be re-fetched from system memory 200). In one embodiment, the prefetch unit 108 may use the tag 164 and/or flow information 168 stored in the evicted trace to identify one or more lines of instructions to fetch into the instruction cache 106 in response to the trace cache eviction. For example, if the tag 164 of the evicted trace identifies the address of the first instruction in program order stored within the trace, the prefetch unit 108 may fetch a line of instructions including the instruction identified by the tag 164 into the instruction cache 106. If the evicted trace includes a predicted taken branch, the line of instructions fetched into instruction cache based on the tag 164 may include instructions that preced the branch in program order. Note that the line of instructions fetched into instruction cache 106 may not include all of the instructions that are included in the evicted trace.

In some embodiments, before a line is fetched into instruction cache 106 in response to a trace cache eviction, the instruction cache 106 may be searched to determine if the line storing the instructions is resident in the instruction cache. If the line storing the instructions is not resident in the instruction cache, a prefetch cycle may be initiated to fetch the required line into instruction cache from level two cache or system memory. Alternatively, the fetch from level two cache or system memory 200 may be initiated without checking to see if the line is present in the instruction cache 106.

In some embodiments, the prefetch unit 108 may fetch multiple lines of instructions into the instruction cache 106 in response to a trace cache eviction. For example, the prefetch unit 108 may use the tag 164 of the evicted trace to select one line of instructions to fetch into the instruction cache 106. In some embodiments, the flow control information 168 for the evicted trace may include enough information for the prefetch unit 108 to identify lines of instructions that include the instructions following predicted-taken branches within the trace. Thus, the prefetch unit 108 may use the flow control information 168 for the evicted trace to identify one or more additional lines to fetch into the instruction cache 106 in response to the trace cache 160 eviction. In some embodiments, the prefetch unit 108 may be configured to fetch a number of lines that is proportional to the number of branch operations included in the evicted trace (e.g., as indicated by flow control information 168).

In other embodiments, each fetch to instruction cache 106 in response to a trace cache 160 eviction may include two lines. For example, if the instruction whose address corresponds to the tag 164 of an evicted trace is stored near the end of a line of instructions, instructions included in the trace may correspond to instructions stored in the next line of the instruction cache 106. The prefetch unit 108 may fetch both lines to increase the likelihood that more of the instructions in the evicted trace will be brought into the instruction cache.

In some embodiments, an evicted trace may not contain many instructions relative to the number of instructions that could have been stored in that trace. In such situations, the prefetch unit 108 may be configured to prefetch fewer lines into the instruction cache 106 than would be prefetched if the evicted trace contained a relatively large number of instructions.

In certain cases, analysis of the evicted trace may indicate that the probability that the instructions corresponding to the trace will be re-executed near term is quite small. For example, trace generator 170 may keep a record of the number of times each trace is used. During the process of selecting of a trace victim, the trace generator may determine that a trace has not been used since it since it entered the trace cache and therefore, it may be selected for eviction. In such instances, the trace generator may inhibit the fetching into the instruction cache of the group of instructions corresponding to the evicted trace.

In some embodiments, the trace cache 160 may be implemented in multiple tiers. Such an implementation may be analogous to the level one and level two caches that store instructions and data within the microprocessor. For example, a trace for which there is no longer room in the level one trace cache may be stored in the level two trace cache. The prefetch unit 108 may be configured to prefetch lines into instruction cache 106 based on trace cache evictions from the highest level (e.g., level two in a two-level trace cache) but not to prefetch lines into instruction cache 106 based on trace cache evictions from lower levels (e.g., level one) of the trace cache 160.

Figure 3:
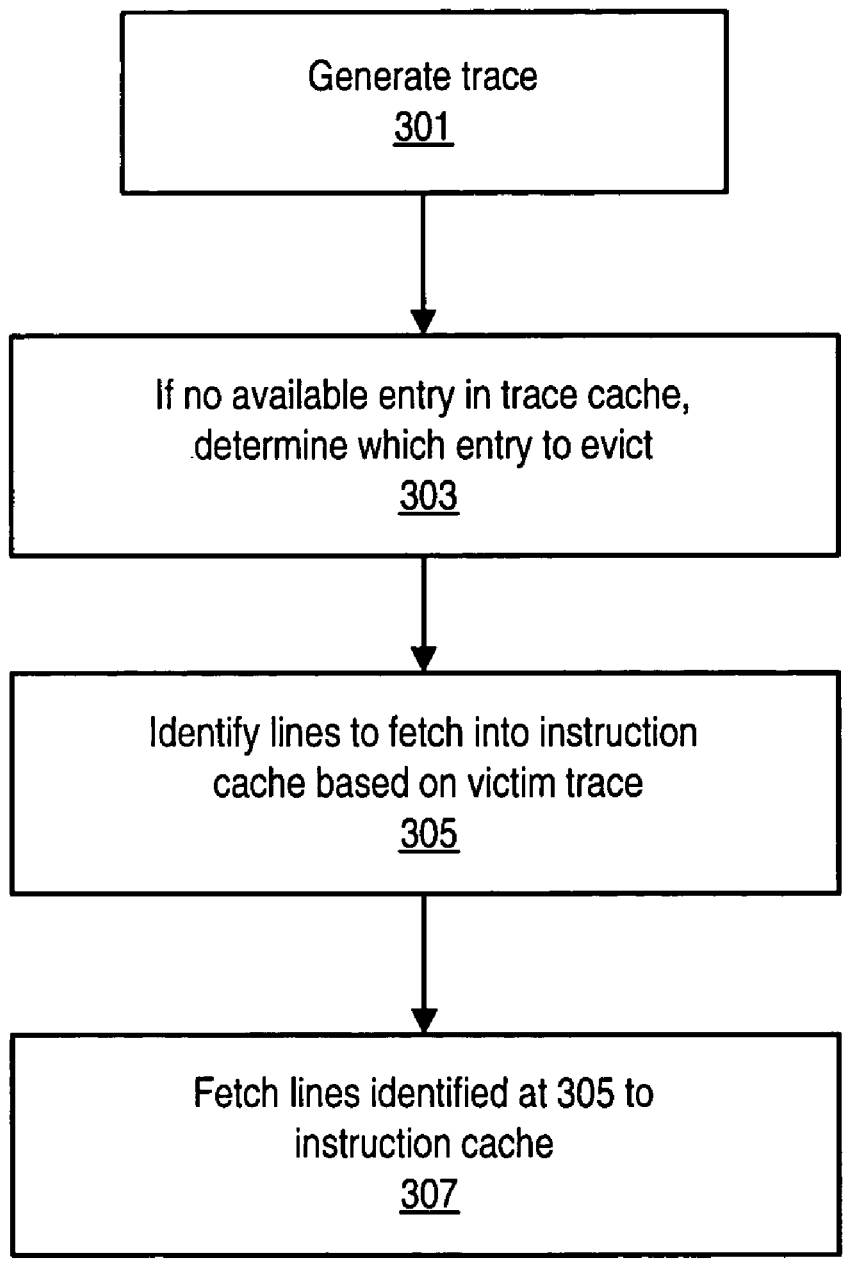
FIG. 3 is a flowchart for a method for fetching instructions from an instruction cache in response to the eviction of traces from a trace cache, according to one embodiment.

FIG. 3 is a flowchart of a method for operating a microprocessor containing a trace cache, according to one embodiment. As shown at 301, a trace is generated requiring the allocation of an entry in trace cache. A trace may be generated from instructions that have been executed and retired in some embodiments. In other embodiments traces may be generated from instructions that are awaiting execution. Block 303 illustrates that if there is no unused entry available in the trace cache, then a trace currently resident in the trace cache may be selected for eviction. In some embodiments, the eviction process may propagate through successive levels of trace cache until a trace is evicted from the highest level of trace cache. Traces may be selected for eviction according to a variety of criteria including least recently used and/or least frequently used.

The evicted trace may be analyzed as shown at block 305 in order to determine the line(s) of instructions to which it corresponds. The analysis may depend on the tag of the first instruction in program order within the trace, how fully populated the trace is, and/or whether any branch instructions within the trace are predicted taken, among other things. Based on this analysis, one or more lines of instructions corresponding to the evicted trace may be fetched into the instruction cache at 309 from level two cache, system memory, or other locations.

Exemplary Computer Systems

Figure 4:
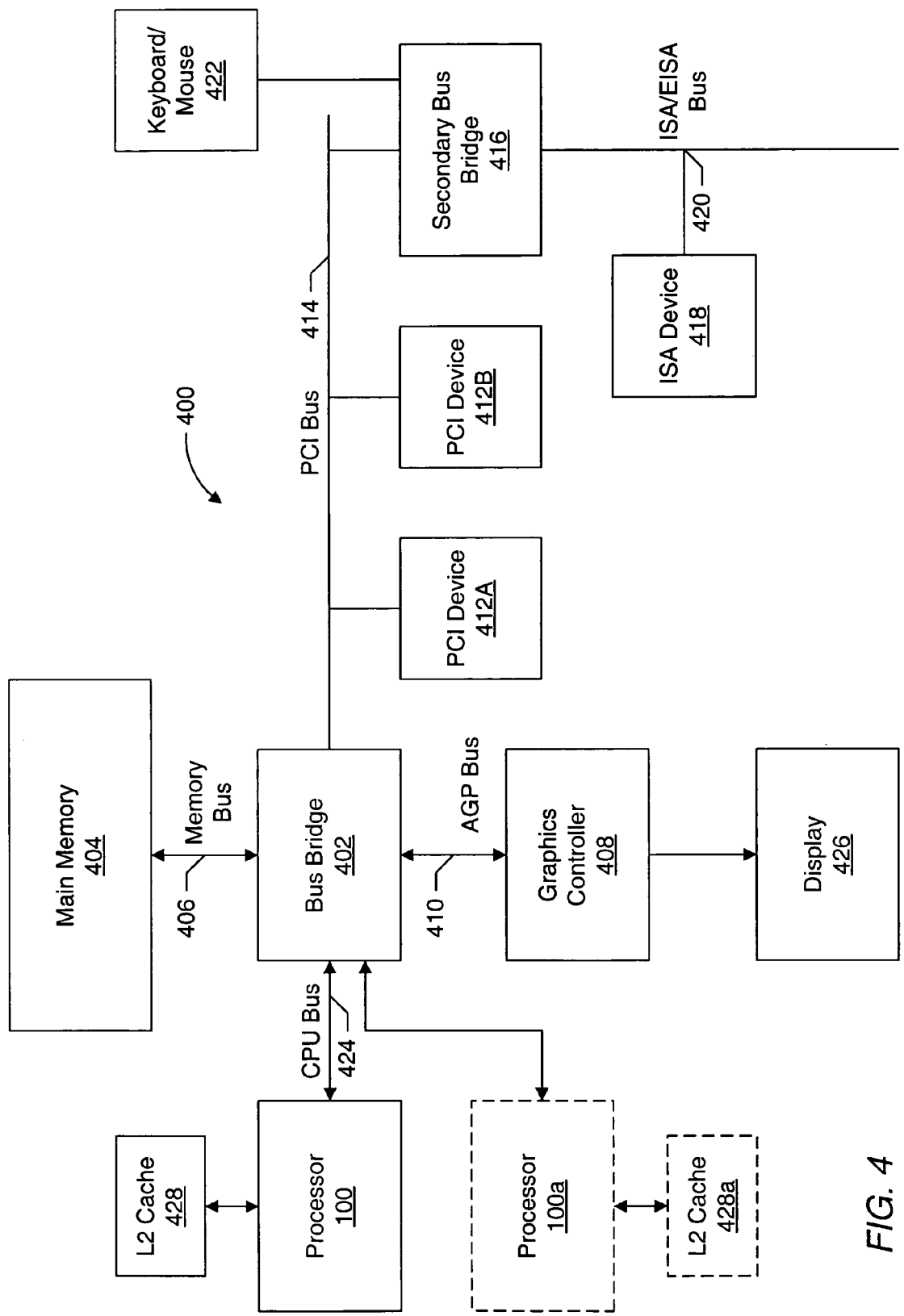
FIG. 4 shows one embodiment of a computer system.

FIG. 4 shows a block diagram of one embodiment of a computer system 400 that includes a microprocessor 100 coupled to a variety of system components through a bus bridge 402. Microprocessor 100 may include an embodiment of a dispatch unit 104, a trace cache 160, a trace cache generator 170, and instruction cache 106, and/or a prefetch unit 108 as described above. Other embodiments of a computer system are possible and contemplated.

In the depicted system, a main memory 200 is coupled to bus bridge 402 through a memory bus 406, and a graphics controller 408 is coupled to bus bridge 402 through an AGP bus 410. Several PCI devices 412A-412B are coupled to bus bridge 402 through a PCI bus 414. A secondary bus bridge 416 may also be provided to accommodate an electrical interface to one or more EISA or ISA devices 418 through an EISA/ISA bus 420. In this example, microprocessor 100 is coupled to bus bridge 402 through a CPU bus 424 and to an optional L2 cache 428. In some embodiments, the microprocessor 100 may include an integrated L1 cache (not shown).

Bus bridge 402 provides an interface between microprocessor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between microprocessor 100 and bus bridge 402 in other embodiments. Alternatively, the external cache may be coupled to bus bridge 402 and cache control logic for the external cache may be integrated into bus bridge 402. L2 cache 428 is shown in a backside configuration to microprocessor 100. It is noted that L2 cache 428 may be separate from microprocessor 100, integrated into a cartridge (e.g., slot 1 or slot A) with microprocessor 100, or even integrated onto a semiconductor substrate with microprocessor 100.

Main memory 200 is a memory in which application programs are stored and from which microprocessor 100 primarily executes. A suitable main memory 200 may include DRAM (Dynamic Random Access Memory). For example, a plurality of banks of SDRAM (Synchronous DRAM) or Rambus DRAM (RDRAM) may be suitable.

PCI devices 412A-412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 200. Graphics controller 408 may therefore be a master of AGP bus 410 in that it can request and receive access to a target interface within bus bridge 402 to thereby obtain access to main memory 200. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional microprocessors (e.g., microprocessor 100a shown as an optional component of computer system 400). Microprocessor 100a may be similar to microprocessor 100. More particularly, microprocessor 100a may be an identical copy of microprocessor 100 in one embodiment. Microprocessor 100a may be connected to bus bridge 402 via an independent bus (as shown in FIG. 4) or may share CPU bus 224 with microprocessor 100. Furthermore, microprocessor 100a may be coupled to an optional L2 cache 428a similar to L2 cache 428.

Figure 5:
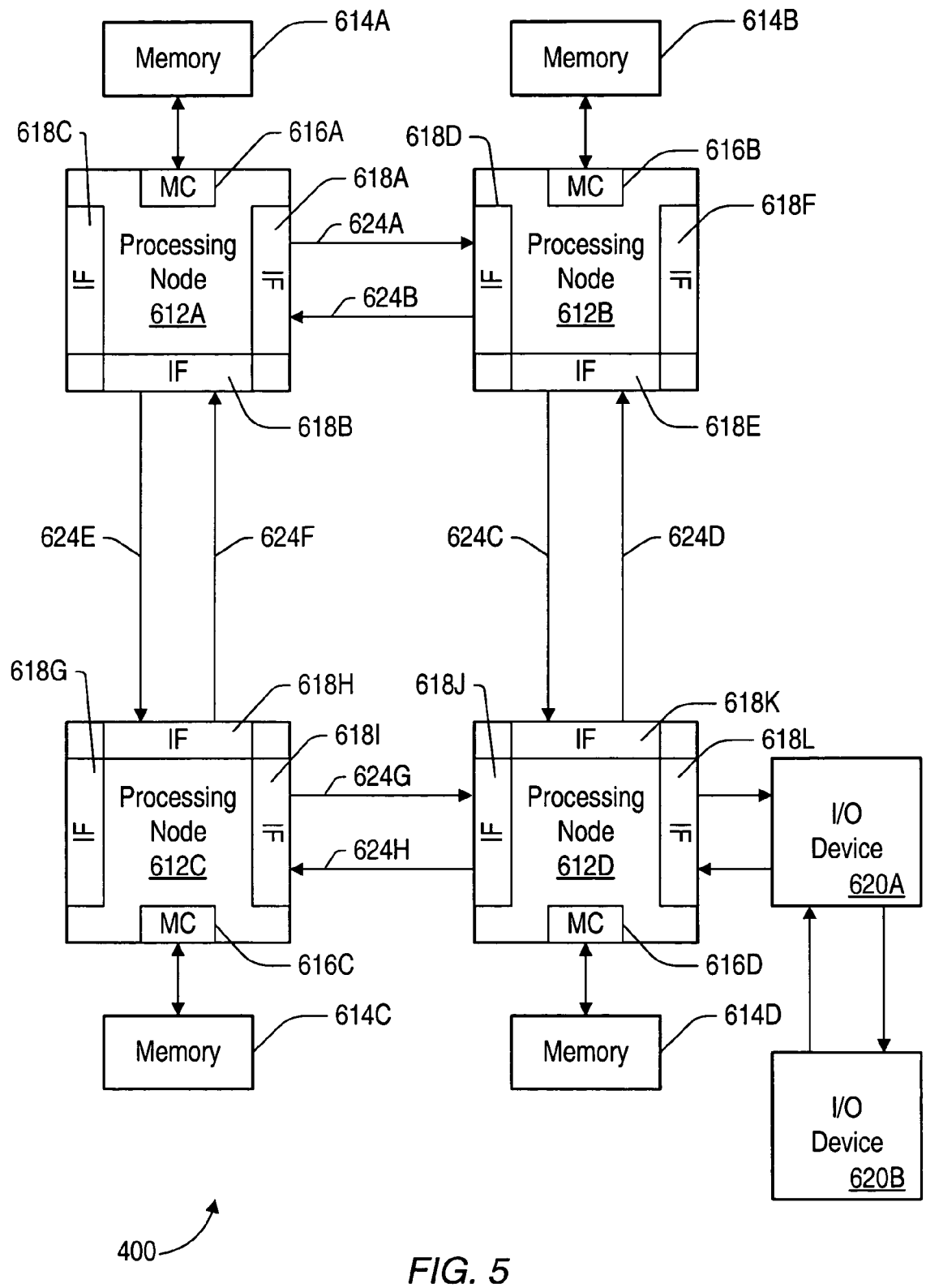
FIG. 5 shows another embodiment of a computer system.

Turning now to FIG. 5, another embodiment of a computer system 400 that may include a microprocessor 100 that includes a dispatch unit 104, a trace cache 160, and/or a trace cache generator 170 as described above is shown. Other embodiments are possible and contemplated. In the embodiment of FIG. 5, computer system 400 includes several processing nodes 612A, 612B, 612C, and 612D. Each processing node is coupled to a respective memory 614A-614D via a memory controller 616A-616D included within each respective processing node 612A-612D. Additionally, processing nodes 612A-612D include interface logic used to communicate between the processing nodes 612A-612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A-620B in a daisy chain configuration) via interface logic 618L. Other processing nodes may communicate with other I/O devices in a similar fashion.

Processing nodes 612A-612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C-624H are used to transmit packets between other processing nodes as illustrated in FIG. 5. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 5. Any suitable routing algorithm may be used. Other embodiments of computer system 400 may include more or fewer processing nodes then the embodiment shown in FIG. 5.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A-612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A-612D may include one or more copies of microprocessor 100. External interface unit 18 may includes the interface logic 618 within the node, as well as the memory controller 616.

Memories 614A-614D may include any suitable memory devices. For example, a memory 614A-614D may include one or more RAMBUS DRAMs (RDRAMs), synchronous DRAMs (SDRAMs), static RAM, etc. The address space of computer system 400 is divided among memories 614A-614D. Each processing node 612A-612D may include a memory map used to determine which addresses are mapped to which memories 614A-614D, and hence to which processing node 612A-612D a memory request for a particular address should be routed. In one embodiment, the coherency point for an address within computer system 400 is the memory controller 616A-616D coupled to the memory storing bytes corresponding to the address. In other words, the memory controller 616A-616D is responsible for ensuring that each memory access to the corresponding memory 614A-614D occurs in a cache coherent fashion. Memory controllers 616A-616D may include control circuitry for interfacing to memories 614A-614D. Additionally, memory controllers 616A-616D may include request queues for queuing memory requests.

Interface logic 618A-618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A-620B may be any suitable I/O devices. For example, I/O devices 620A-620B may include devices for communicate with another computer system to which the devices may be coupled (e.g., network interface cards or modems). Furthermore, I/O devices 620A-620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. A microprocessor, comprising:
an instruction cache;
a trace cache; and
a prefetch unit coupled to the instruction cache and the trace cache;
wherein the prefetch unit is configured to prefetch instruction code from a system memory for storage within the instruction cache, wherein the system memory is distinct from the instruction cache and the trace cache, wherein the prefetch unit is further configured to prefetch a line of instructions from the system memory into the instruction cache in response to a trace being evicted from the trace cache, wherein the line of instructions is not currently needed for execution, wherein the line of instructions prefetched from the system memory is dependent on contents of the trace evicted from the trace cache, and wherein the line of instructions is prefetched in anticipation of instructions included in the evicted trace being re-executed.

2. The microprocessor of claim 1, wherein the prefetch unit is configured to prefetch a line into the instruction cache from the system memory comprising instructions that correspond to operations that precede a branch in the evicted trace.

3. The microprocessor of claim 1, wherein the prefetch unit is configured to prefetch a line into the instruction cache from the system memory comprising instructions that correspond to operations that follow a branch in the evicted trace.

4. The microprocessor of claim 1, wherein the prefetch unit is configured to prefetch a plurality of lines of instructions into the instruction cache from the system memory in response to the trace being evicted from the trace cache.

5. The microprocessor of claim 4, wherein the prefetch unit is configured to prefetch a number of lines from the system memory that is proportional to the number of branch operations comprised in the evicted trace.

6. The microprocessor of claim 1, wherein the prefetch unit is configured to inhibit the prefetch of a line of instructions into the instruction cache from the system memory in response to the eviction of certain traces from the trace cache if the line of instructions is already stored in the instruction cache.

7. The microprocessor of claim 1, wherein the prefetch unit is configured to inhibit the prefetch of a line of instructions into the instruction cache from the system memory in response to the eviction of certain traces from the trace cache if the evicted trace is predicted unlikely to re-execute.

8. A computer system, comprising:
a system memory; and
a microprocessor coupled to the system memory, comprising:
an instruction cache;
a trace cache; and
a prefetch unit coupled to the instruction cache and the trace cache;
wherein the prefetch unit is configured to prefetch instruction code from the system memory for storage within the instruction cache, wherein the system memory is distinct from the instruction cache and the trace cache, wherein the prefetch unit is configured to prefetch a line of instructions from the system memory into the instruction cache in response to a trace being evicted from the trace cache, wherein the line of instructions is not currently needed for execution, wherein the line of instructions prefetched from the system memory is dependent on contents of the trace evicted from the trace cache, and wherein the line of instructions is prefetched in anticipation of instructions included in the evicted trace being re-executed.

9. The computer system of claim 8, wherein the prefetch unit is configured to prefetch a line into the instruction cache from the system memory comprising instructions which correspond to operations that precede a branch in the evicted trace.

10. The computer system of claim 8, wherein the prefetch unit is configured to prefetch a line into the instruction cache from the system memory comprising instructions which correspond to operations that follow a branch in the evicted trace.

11. The computer system of claim 8, wherein the prefetch unit is configured to prefetch a plurality of lines of instructions into the instruction cache from the system memory in response to the trace being evicted from the trace cache.

12. The computer system of claim 11, wherein the prefetch unit is configured to prefetch a number of lines from the system memory that is proportional to the number of branch operations comprised in the evicted trace.

13. The computer system of claim 8, wherein the prefetch unit is configured to inhibit the prefetch of a line of instructions into the instruction cache from the system memory in response to the eviction of certain traces from the trace cache if the line of instructions is already stored in the instruction cache.

14. The computer system of claim 8, wherein the prefetch unit is configured to inhibit the prefetch of a line of instructions into the instruction cache from the system memory in response to the eviction of certain traces from the trace cache if the evicted trace is predicted unlikely to re-execute.

15. A method, comprising:
evicting a trace from a trace cache; and
prefetching a line of instructions into an instruction cache from a system memory in response to said evicting;
wherein the system memory is distinct from the instruction cache and the trace cache;
wherein the line of instructions prefetched from the system memory is dependent on contents of the trace evicted from the trace cache;
wherein the line of instructions is not currently needed for execution, and wherein the line of instructions is prefetched in anticipation of instructions included in the evicted trace being re-executed.

16. The method of claim 15, further comprising checking the instruction cache for lines of instructions comprising the instructions corresponding to the evicted trace.

17. The method of claim 16, further comprising inhibiting the prefetching of the line of instructions into the instruction cache from the system memory if the line of instructions is stored in the instruction cache.

18. The method of claim 15, further comprising predicting the likelihood that the evicted trace will be re-executed and inhibiting said prefetching of the line of instructions into the instruction cache from the system memory if the evicted trace is predicted unlikely to re-execute.

19. The method of claim 15, wherein said prefetching comprises prefetching a line into the instruction cache from the system memory comprising instructions that correspond to operations that precede a branch in the evicted trace.

20. The method of claim 15, wherein said prefetching comprises prefetching a line into the instruction cache from the system memory comprising instructions that correspond to operations that follow a branch in the evicted trace.

21. The method of claim 15, wherein said prefetching comprises prefetching a plurality of lines of instructions into the instruction cache from the system memory in response to the trace being evicted from the trace cache.

22. The method of claim 15, wherein the number of lines prefetched from the system memory is proportional to the number of branch operations comprised in the evicted trace.

23. A microprocessor, comprising:
means for evicting a trace from trace cache;
means for prefetching one or more lines into an instruction cache from a system memory in response to said evicting;
wherein the system memory is distinct from the instruction cache and the trace cache;
wherein the one or more lines of instructions prefetched from the system memory is dependent on contents of the trace evicted from the trace cache;
wherein the line of instructions is not currently needed for execution, and wherein the line of instructions is prefetched in anticipation of instructions included in the evicted trace being re-executed.

* * * * *